May 28, 1968  R. MATHEY  3,385,253
SYSTEM FOR TRANSFORMING A ROTATIONAL MOVEMENT
INTO AN ALTERNATING TORSIONAL MOVEMENT
Filed July 7, 1966  4 Sheets-Sheet 1
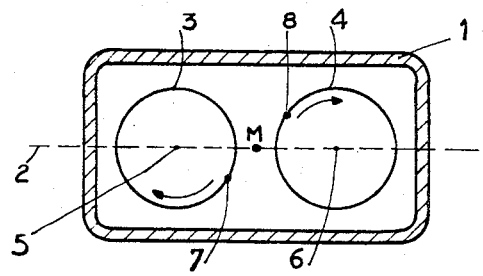
FIG_1
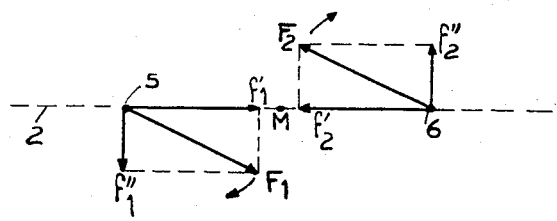
FIG_2
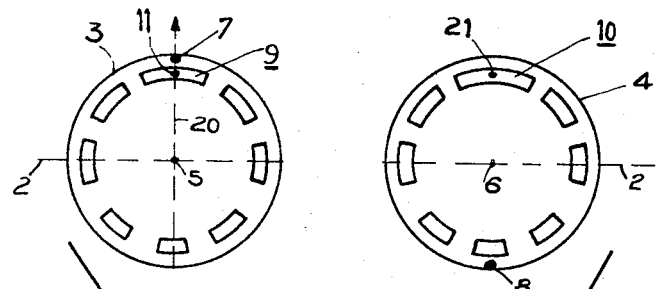
FIG_3
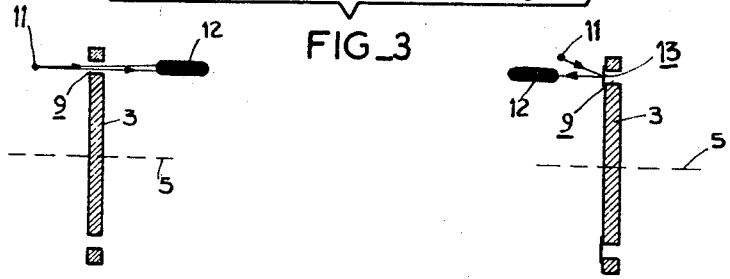
FIG_4a  FIG_4b

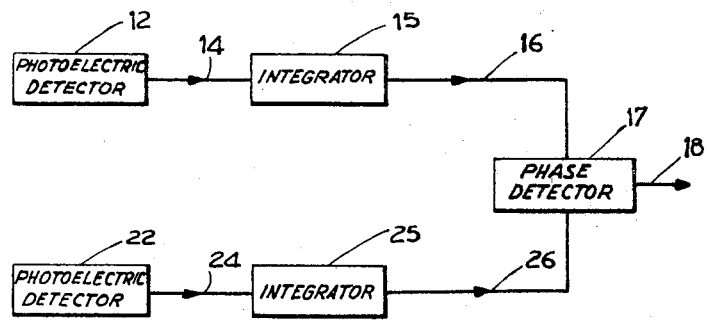
FIG_5
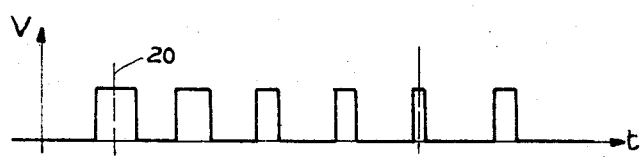
FIG_6
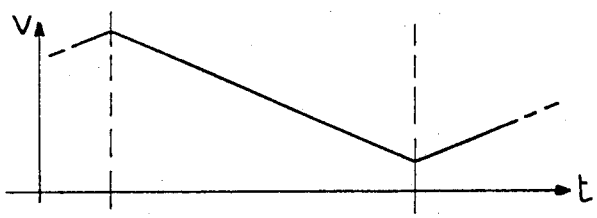
FIG_7

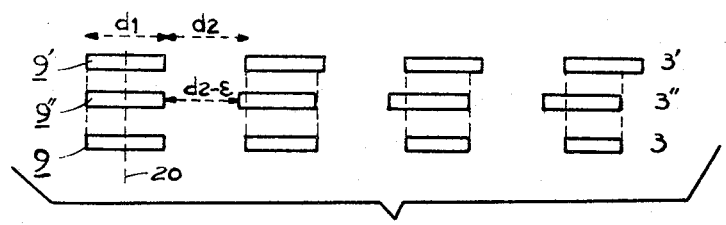
FIG_8
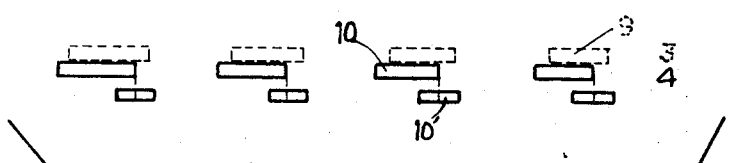
FIG_9
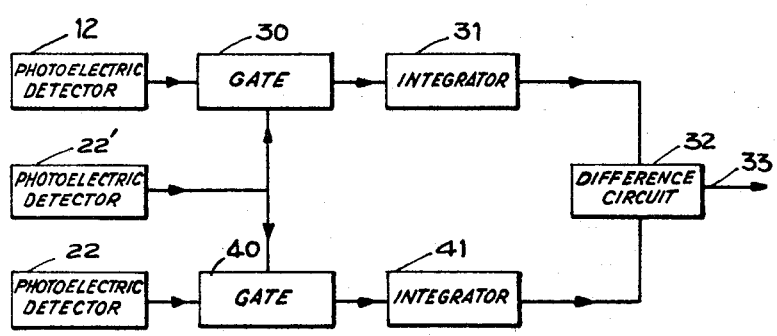
FIG_10

May 28, 1968 R. MATHEY 3,385,253
SYSTEM FOR TRANSFORMING A ROTATIONAL MOVEMENT
INTO AN ALTERNATING TORSIONAL MOVEMENT
Filed July 7, 1966 4 Sheets-Sheet 4

United States Patent Office 3,385,253
Patented May 28, 1968

3,385,253
SYSTEM FOR TRANSFORMING A ROTATIONAL MOVEMENT INTO AN ALTERNATING TORSIONAL MOVEMENT
Raymond Mathey, Paris, France, assignor to CSF—Compagnie Generale de Telegraphie San Fil, a French corporation
Filed July 7, 1966, Ser. No. 563,424
8 Claims. (Cl. 115—.5)

ABSTRACT OF THE DISCLOSURE

Arrangement for transforming a rotational movement into a vibrating movement in which two parallel shafts, which are rotated in the same direction, have respective identical unbalances offset by an angular shift, which is maintained equal to $\pi$.

The present invention, relates to an arrangement for transforming a rotational movement into an alternating torsional or vibrating movement.

According to the invention there is provided a system for transforming a rotational movement into a vibrating movement comprising: a rigid housing; two parallel, coplanar shafts journalled in said housing and having an identical want of balance, the respective unbalances being offset by $\pi$ radians with respect to each other; respective motor means for rotating said shafts in the same direction; and controlling means for controlling the rotational speed of said motor means.

The invention also provides a vessel which is propelled by means of the above system.

The invention will be further explained with reference to the accompanying drawings, in which:

FIG. 1 shows diagrammatically and in cross-section a system according to the invention;

FIG. 2 is a diagram of the forces resulting from the rotation of the shafts;

FIG. 3 shows an embodiment of the discs used in the system according to the invention;

FIGS. 4a and 4b show two embodiments of an arrangement for the optical detection of the passage of the holes shown in FIG. 3 embodiment;

FIG. 5 is a block diagram of a system generating an error signal for controlling the rotational speed of the two shafts of the system according to the invention;

FIGS. 6 and 7 show signals as a function of the time at certain points of the system;

FIG. 8 shows an embodiment of a disc used in a system according to the invention;

FIG. 9 shows a modification of the discs used in the system according to the invention;

FIG. 10 is a block diagram of the system using the discs of FIG. 9 and generating the error signal;

Figure 11:
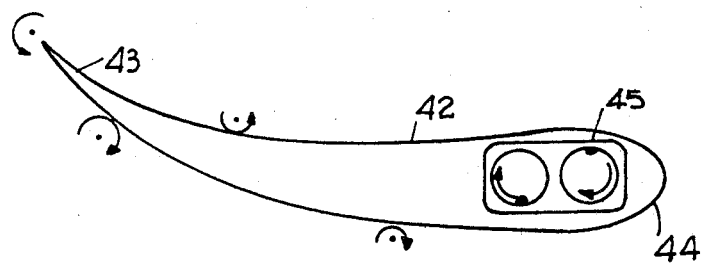
FIG. 11 show diagrammatically a vessel propelled by means of an arrangement according to the invention.

FIG. 1 shows in cross-section an embodiment of a system according to the invention. A rigid housing 1 contains two parallel shafts 5 and 6, which extend perpendicularly to the plane of the drawing and whose traces are diagrammatically shown by points. These shafts 5 and 6 are coplanar and located in a plane perpendicular to that of the drawing. The projection of this plane is shown by the straight line 2.

The shafts 5 and 6 are journalled in the housing 1. They carry, respectively, discs 3 and 4 which are made solid therewith.

The shafts 5 and 6 are rotated in the same direction (as indicated by the arrows), for example, by means of electric motors mounted inside the housing 1, and have the same want of balance. In the drawing, this unbalance is indicated by masses $m$ placed at the points 7 and 8 on the periphery of the discs 3 and 4. Actually the weights 7 and 8 may be carried by the shafts 5 and 6. An angular shift by $\pi$ is maintained between the two shafts, and accordingly between the weights 7 and 8 during the rotation of the shafts.

The weights 7 and 8 create during the rotation of the shafts 5 and 6 forces $F_1$ and $F_2$ of equal magnitude which are applied to the shafts 5 and 6. These forces are directed, respectively, in the direction of the weights 7 and 8 and are shown in FIG. 2.

By decomposing these forces into their components along the straight line 2 and a perpendicular thereto, two components $f_1'$ and $f_2'$ are obtained along the straight line 2, and along the perpendicular to the line 2 two components $f_1''$ and $f_2''$. Since the weights 7 and 8 are identical and angularly spaced by $\pi$ radians, the components $f_1'$ and $f_2'$ cancel each other out constantly, while the components $f_1''$ and $f_2''$ form an alternating couple which subjects the assembly to a torsional alternating movement about an axis M, parallel to the shafts 5 and 6 and equidistant therefrom.

The discs serve to mark the positions of the shafts 5 and 6 relative to each other. For this purpose, they may have holes with different dimensions, 9 and 10 respectively, as shown in FIG. 3. Only a few of these holes are shown, but, for example, a disc of 8 cm. diameter may have a hundred holes or so.

The disc 3 is symmetrical relative to the axis 20 passing through the shaft 5 and the weight 7. The length of the holes varies with the angular distance from the axis 20, from $d_1$, for an angular distance equal 0, to $d_1/n$, where $n$ may be equal to 2, for an angular distance $\pi$ radians. These variations may follow a sinusoidal or a linear law.

The disc 4 is identical to the disc 3, but the unbalancing weight 8 is spaced by $\pi$ radians relative to the weight 7.

In similar positions with respect to the two discs 3 and 4 are placed sources of light 11 and 21 and photoelectric detectors 12 and 22 respectively.

The source 11 and the detector 12 may either be on opposite sides of the disc 3, as shown in FIG. 4a or on the same side, as shown in FIG. 4b, if reflecting plates 13 are used instead of the holes 9. The same applies to the source 21 and the detector 22 for the disc 4.

FIG. 5 shows a block diagram of a circuit associated with the detectors 12 and 22 and permitting the control of the speed of one shaft relative to the other.

The photoelectric detector 12 is connected by a connection 14 to an integrating device 15. The output of this integrator is connected by a connection 16 to a phase detector 17. Similarly, the photoelectric detector 22 is connected by a connection 24 to an integrator 25, connected in turn by a connection 26 to a second input of the detector 17.

The operation is as follows:

When the discs 3 and 4 rotate, the photoelectric detectors 12 and 22 supply a signal presenting a series of square wave pulses of different lengths, corresponding to the length of the holes in the discs. The signals recovered by the connections 14 and 24 have the shape shown in FIG. 6. After integration, signals which are either sinusoidal, if the variation in the length of the holes in the discs is sinusoidal, or triangular as shown in FIG. 7, if this law of variation is linear, are collected at the outputs 16 and 26.

If the shafts turn with an angular shift equal to $\pi$ radians the two discs turn without any shift, the signals received by the detector 17 are in phase and no signal is received at the output 18.

If the shafts are angularly shifted with respect to each other by a value different from $\pi$ radians, an error signal will appear at 18 and may be used for controlling the rotational speed of one of the shafts by the speed of the other so as to keep the angular shift to the value $\pi$ radians. This may be achieved in any conventional manner by modifying the speed of at least one of the shafts 5 and 6.

FIG. 8 shows a simple arrangement for obtaining a linear variation in the size of the holes. For example, the disc 3 comprises holes 9 and consists of two discs 3' and 3", glued together and having holes 9' and 9", respectively, which are all equal and have the length $d_1$.

The drawing shows in developed form the holes of the three discs, starting from the hole 9 with maximum length, i.e., the hole located on the axis 20.

The spacing between the holes 9' is $d_2$, which may be, for example, equal to $d_1$. The spacing of the holes 9" is $d_2-\epsilon$ for the first half of the circumference starting from the axis 20, then $d_2+\epsilon$ over the other half of the circumference. By assembling the discs 3' and 3", one obtains the disc 3 in which adjacent holes 9 have a length differing by $\epsilon$.

For obtaining a finer adjustment of the angular shift between the two shafts, one may use, in addition to the arrangement just described, the arrangement shown in FIGS. 9 and 10.

In FIG. 9, one of the discs, for example the disc 4, comprises, in addition to holes 10, holes 10' with constant length equal to a fraction of the maximum length of the holes 10. This fraction may be ½. The holes 10' are centered on the same edges of the holes 10. The source of light 21 and a photoelectric detector 22' serve for detecting the passage of light through the holes 10'.

FIG. 10 shows a block diagram of the circuit used according to the invention for performing the fine adjustment.

The detector 22' supplies square-wave signals controlling two gate circuits 30 and 40, connected respectively after the detectors 12 and 22. The signals coming from the circuits 30 and 40 are passed to two integrating circuits 31 and 41. The circuit 32 supplies at its output 33 the difference between the signals coming from the circuits 31 and 41.

The operation is as follows:

The detector 22 and the gate circuit 40 controlled by the signals coming from the detector 22' supply pulses with constant duration. These signals, are integrated by the circuit 41 and give a continuous signal with constant level.

Similarly, the detector 12 and the circuits 30 and 31 give a continuous signal whose level is equal to that of the signal supplied by the circuit 41 if there is no angular shift between the holes 9 and 10.

The circuit 32 supplies therefore zero voltage. If there is an angular shift between the holes 9 and the holes 10, the pulses supplied by the circuit 30 are longer or shorter, as the case may be, than those supplied by the circuit 40. The difference between the signals obtained after integration by the circuits 31 and 41 will therefore be positive or negative, and the voltage obtained at the output 33 of the circuit 32 is used for controlling in an accurate manner the rotational speeds of the two shafts.

Figure 12:
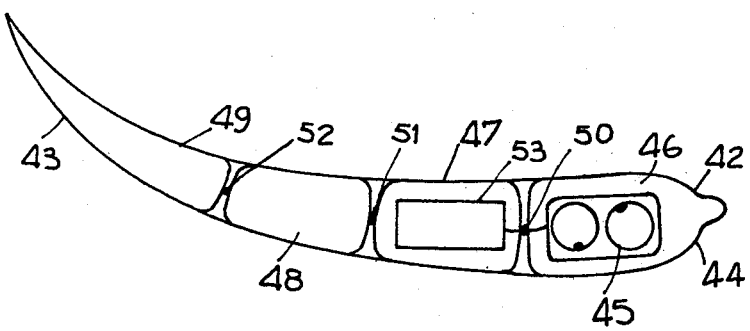
FIG. 12 shows the same vessel in more detail.

FIGURES 11 and 12 show a vessel which is propelled by means of the above described arrangement.

The vessel is formed by a flexible and elongated enclosure 42 somewhat similar to the body of a dolphin. The outer surface has a certain amount of flexibility in order to decrease the dynamical viscosity and the front portion 44 has a rounded up form in order to contribute to the formation of vortices along the body of the vessel. The structure should have a narrower section at the rear portion 43 thereof than at the front portion 44, being as already mentioned, shaped somewhat as the body of a dolphin.

The above described system 45 for converting rotational motion into a vibrating motion is placed at the front end 44 of the vessel. The vibrating motion causes vortices to appear and propagate along the surface of the vessel and, on the whole, the vessel advances somewhat as a dolphin swimimng in water.

A structure 1 meter long and weighing some ten kilos is thus submitted to a propelling force equal to its weight with a vibration having a frequency of 10 cycles per second.

The structure may be used as a torpedo or a submarine of limited size. The front portion undergoes only low amplitude vibrations while the rear portion vibrates with a greater amplitude.

The arrangement has a good efficiency and is highly noiseless due to the absence of gear of any kind.

FIGURE 2 shows na embodiment of vessel according to the invention.

The body 42 comprises several boxes 46 to 49 which are hinged on each other at points 50 to 52 respectively. The prime mover 45 according to the invention is located within the front box 46 and the batteries 53 for feeding the motors which drive the shafts may be located within the box 47. The other boxes need not be hollow but should be preferably flexible, being, for example, made of rubber or other elastic material. Preferably the space between the hinged boxes should be filled with a flexible substance such as silasthen, the same substance covering the outer surface of the boxes 46 to 49 to insure a better distribution of the pressure along the body of the vessel. Also springs may be inserted between the boxes.

Of course the outer dimension of the boxes 46 to 49 should be such that the vessel should, on the whole, have an appearance somewhat similar to that of the body of a dolphin or a fish.

Of course, the invention is not limited to the embodiments described many other embodiments being possible without departing from the spirit and scope of the invention.

What is claimed is:

1. A system for transforming a rotational movement into a vibrating movement comprising: a rigid housing; two parallel, coplanar shafts journalled in said housing and having an identical want of balance, the respective unbalances being offset by $\pi$ radians with respect to each other; respective motor means for rotating said shafts in the same direction; and controlling means for controlling the rotational speed of said motor means.

2. A system as claimed in claim 2 further including follow-up means for causing the angular position of one shaft to follow-up the angular position of the other.

3. A system as claimed in claim 2, wherein said follow-up means comprise: respective discs rigidly connected to said shafts; and electro-optical means for detecting the respective positions of said discs and for supplying an error voltage to said motor controlling means.

4. A system as claimed in claim 3, wherein said discs and said electro-optical means are identical, each disc having holes of different lengths and said electro-optical means comprising a source of light and a photoelectric detector, positioned for supplying pulses upon the respective passage of said holes before said source; two integrators being respectively connected to said photoelectric detectors; and a phase detector for supplying said error voltage, said phase detector having two inputs respectively connected to said integrators.

5. A system as claimed in claim 3, wherein different length holes of one disc are identical to holes in the other disc, one of said discs having further holes of equal length smaller than the length of said identical holes, said further holes being centered on the same edges of said identical holes, and wherein said electro-optical means comprise: two optical systems, each comprising a source of light and a photoelectric detector, identically disposed for supplying pulses upon the respective passage of said identical holes of each of said discs before said corresponding sources; a further photoelectric detector for supplying pulses upon the passage of said further holes before said source corresponding to said one disc; two gates, each having a signal input and a control input, said photoelectric detectors of said optical systems being respectively connected to said signal inputs of said gates and said further photoelectric detector being connected to said control inputs; two integrators respectively connected to said gates; and a difference circuit for supplying said error voltage, said difference circuit having two inputs respectively connected to said integrators.

6. A marine vessel comprising a flexible, elongated, dolphin-shaped enclosure having a substantially flexible outer surface and a system for transforming a rotational movement into a vibrating movement, said system being rigidly fixed inside the front portion of said enclosure and comprising: bearings fixed to said enclosure; two parallel coplanar shafts journalled in said bearings and having an identical want of balance, the respective unbalances being offset by $\pi$ with respect to each other; respective motor means for rotating said shafts in the same direction; and controlling means for controlling the rotational speed of said motor means.

7. A vessel as claimed in claim 6, wherein said enclosure comprises a plurality of boxes hinged on each other, said system being located in the front one of said boxes.

8. A vessel as claimed in claim 7, wherein said boxes are coated with flexible material.

References Cited

UNITED STATES PATENTS

| 2,936,729 | 5/1960 | Kuttner | 115—28 |
| 3,118,639 | 1/1964 | Kiceniuk | 115—29 XR |

FOREIGN PATENTS

| 26,098 | 1910 | Great Britain. |

ANDREW H. FARRELL, *Primary Examiner.*